United States Patent
Vu et al.

(10) Patent No.: US 9,547,623 B2
(45) Date of Patent: Jan. 17, 2017

(54) FLEXIBLE MEMORY INTERFACE SYSTEM FOR INDEPENDENTLY PROCESSING DIFFERENT PORTIONS OF AN INSTRUCTION

(75) Inventors: Steve Vu, Austin, TX (US); Jean Charles Pina, Austin, TX (US)

(73) Assignee: SIGMATEL, INC., Austin, TX (US)

( * ) Notice: Subject to any disclaimer, the term of this patent is extended or adjusted under 35 U.S.C. 154(b) by 1305 days.

(21) Appl. No.: 10/865,585

(22) Filed: Jun. 10, 2004

(65) Prior Publication Data

US 2005/0005078 A1     Jan. 6, 2005

Related U.S. Application Data

(60) Provisional application No. 60/484,366, filed on Jul. 2, 2003.

(51) Int. Cl.
*G06F 13/16*    (2006.01)
*G06F 13/42*    (2006.01)

(52) U.S. Cl.
CPC ....... *G06F 13/4234* (2013.01); *G06F 13/1668* (2013.01); *G06F 2213/0038* (2013.01)

(58) Field of Classification Search
CPC .............. G06F 13/4234; G06F 13/1668; G06F 2213/0038
See application file for complete search history.

(56) References Cited

U.S. PATENT DOCUMENTS

| | | | | |
|---|---|---|---|---|
| 5,274,792 A | * | 12/1993 | Sato | 711/168 |
| 5,504,871 A | * | 4/1996 | Takashi | 711/5 |
| 5,828,905 A | * | 10/1998 | Rao | 710/63 |
| 5,870,756 A | * | 2/1999 | Nakata | G06F 3/0601 |
| 6,438,638 B1 | * | 8/2002 | Jones et al. | 710/301 |
| 6,671,764 B2 | * | 12/2003 | Martin | 710/301 |
| 6,681,301 B1 | * | 1/2004 | Mehta et al. | 711/154 |
| 6,807,609 B1 | * | 10/2004 | Lemmon et al. | 711/150 |
| 6,941,405 B2 | * | 9/2005 | Morrow | 710/305 |
| 2004/0037233 A1 | * | 2/2004 | Suzuki | H04L 12/4625 370/252 |

(Continued)

OTHER PUBLICATIONS

Hennessy, John L., Patterson, David A., "Computer Organization and Design, The Hardware/Software Interface", 1998, Morgan Kaufmann Publishers, Inc., Second Edition, pp. 356-357, 363, 367, 370, 383, 385, 388-389, 393, 561-562.*

(Continued)

*Primary Examiner* — Arpan P. Savla

(57) ABSTRACT

A flexible memory interface system includes a control module, instruction memory, a command processing unit, an address processing unit, and a data processing unit. The control module controls storing and retrieving of a command portion, an addressing portion, and data of an instruction to access memory to and from the instruction memory and the command processing unit, the address processing unit, and the data processing unit, respectively. The command processing unit is operably coupled to process a command portion of an instruction to access memory. The address processing unit is operably coupled to process an addressing portion of the instruction to access the memory. The data processing unit is operably coupled to process data conveyance to or from the external memory based on the instruction to access the memory.

25 Claims, 5 Drawing Sheets

(56) References Cited

U.S. PATENT DOCUMENTS

2004/0068601 A1* 4/2004 Kang et al. ............ 710/301
2006/0064508 A1* 3/2006 Panwar ............ H04L 49/90
                                                    709/250

OTHER PUBLICATIONS

Hennessy, John L., Patterson, David A., "Computer Organization and Design, The Hardware/Software Interface", 1998, Morgan Kaufmann Publishers, Inc., Second Edition, pp. 382-388.*
Ramakrishna et al., "Instruction-Level Parallel Processing History, Overview, and Perspective", Oct. 1992, Hewlett-Packard Company, pp. 1-56.*
Hennessy, John L., Patterson, David A., "Computer Organization and Design, The Hardware/Software Interface", 1998, Morgan Kaufmann Publishers, Inc., Second Edition, pp. 436-440 and 466-470.*
IEEE 100: The Authoritative Dictionary of IEEE Standards Terms, Dec. 2000, IEEE Press, Seventh Edition, pp. 791-792.*
Hennessy, John L., Patterson, David A., "Computer Organization and Design, The Hardware/Software Interface", 1998, Morgan Kaufmann Publishers, Inc., Second Edition, pp. C-7 and C-8.*
Hennessy, John L., Patterson, David A., "Computer Organization and Design, The Hardware/Software Interface", 1998, Morgan Kaufmann Publishers, Inc., Second Edition, pp. 356-370.*

\* cited by examiner multiple function battery operated device 60 flexible memory interface 64

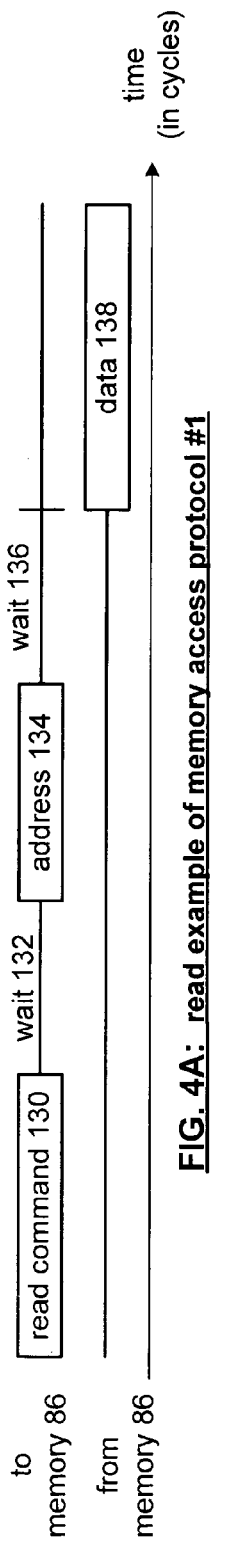
FIG. 4A: read example of memory access protocol #1
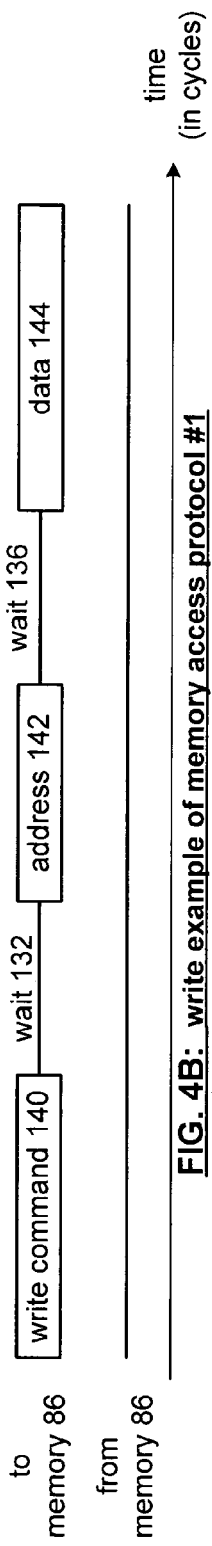
FIG. 4B: write example of memory access protocol #1
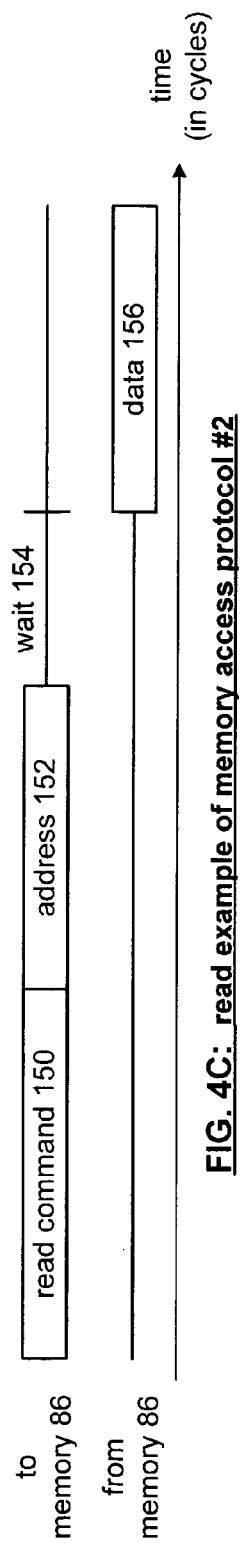
FIG. 4C: read example of memory access protocol #2
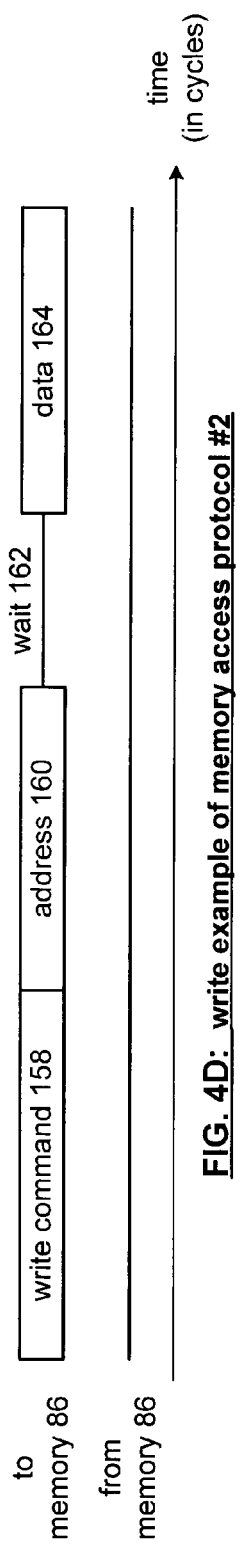
FIG. 4D: write example of memory access protocol #2

FLEXIBLE MEMORY INTERFACE SYSTEM FOR INDEPENDENTLY PROCESSING DIFFERENT PORTIONS OF AN INSTRUCTION

This invention is claiming priority under 35 USC §119(e) to a provisionally filed patent application having the same title as the present patent application, a filing date of Jul. 2, 2003 and an application Ser. No. of 60/484,366.

BACKGROUND OF THE INVENTION

Technical Field of the Invention

This invention relates generally to portable electronic equipment and more particularly to a multi-function handheld device and a battery-optimized system-on-a-chip used therein.

Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, such handheld devices use a battery (or batteries) to supply power to the circuitry of the device. The more power the circuitry consumes, the shorter the battery life (i.e., how long the device can be operated before having to replace or charge the battery). Several techniques have been developed to reduce power consumption of battery-powered circuitry. One technique is to turn off circuitry that is not needed to support the present function and to put the device in a "sleep" mode when the entire device is not in use. Another technique relates to improvements in integrated circuit fabrication, which allow for smaller devices to be developed and to operating at lower voltages, thus consuming less power. For example, 0.18 micron CMOS integrated circuit technology is currently the most popular process, which uses supply voltages of 1.8 volts. Just a few years ago, however, 0.35 micron and 0.50 micron CMOS IC technology were the most popular processes, which used supply voltages of about 3.3 volts. In the near future, 0.10 and 0.13 micron CMOS IC technology will most likely become the technology of choice, which use supply voltages of about 1.0 volts. While these techniques work to reduce power consumption, they are not optimized on a chip-by-chip basis, but are designed based on worst-case operation of the integrated circuit. As such, a majority of the integrated circuit circuits are consuming more power than necessary, since the power reducing techniques are worst-case based and not individually established.

Yet further, many handheld devices include an external memory interface to couple to external memory, such as a memory stick, flash memory, etc. The memory interface typically includes a state machine that is programmed to process the reading to and writing from the external memory in accordance with a standardized memory access protocol. As is known, many external memory devices use a standardized memory access protocol, however, recently some manufacturers have deviating from the standardized memory access protocol. The non-standard external memories offer some advantages over the standardized memories, thus are desirable for use with the handheld devices. However, the memory interface state machine is not capable of processing the memory access requests for non-standard memory. Thus, a handheld device would require multiple state machines to process memory access requests with standard and non-standard memories.

Therefore, a need exists for an integrated circuit that provides multiple functions for handheld devices including flexible external memory interfacing.

BRIEF SUMMARY OF THE INVENTION

The flexible memory interface system of the present invention substantially meets these needs and others. In one embodiment, a flexible memory interface system includes a control module, instruction memory, a command processing unit, an address processing unit, and a data processing unit. The control module controls storing and retrieving of a command portion, an addressing portion, and data of an instruction to access memory to and from the instruction memory and the command processing unit, the address processing unit, and the data processing unit, respectively. The command processing unit is operably coupled to process a command portion of an instruction to access memory. The address processing unit is operably coupled to process an addressing portion of the instruction to access the memory. The data processing unit is operably coupled to process data conveyance to or from the external memory based on the instruction to access the memory. The command processing unit, the address processing unit, and the data processing unit may be implemented as separate state machines that separately process their respective portions of an instruction to access memory under the control of the control module such that various memory access protocols, whether standardized or non-standardized, may be accommodated by a single memory access system.

BRIEF DESCRIPTION OF THE SEVERAL VIEWS OF THE DRAWINGS

FIGS. 4A, 4B, 4C, and 4D are examples of memory access instructions based on different memory access protocols in accordance with the present invention.

DETAILED DESCRIPTION OF THE INVENTION

Figure 1:
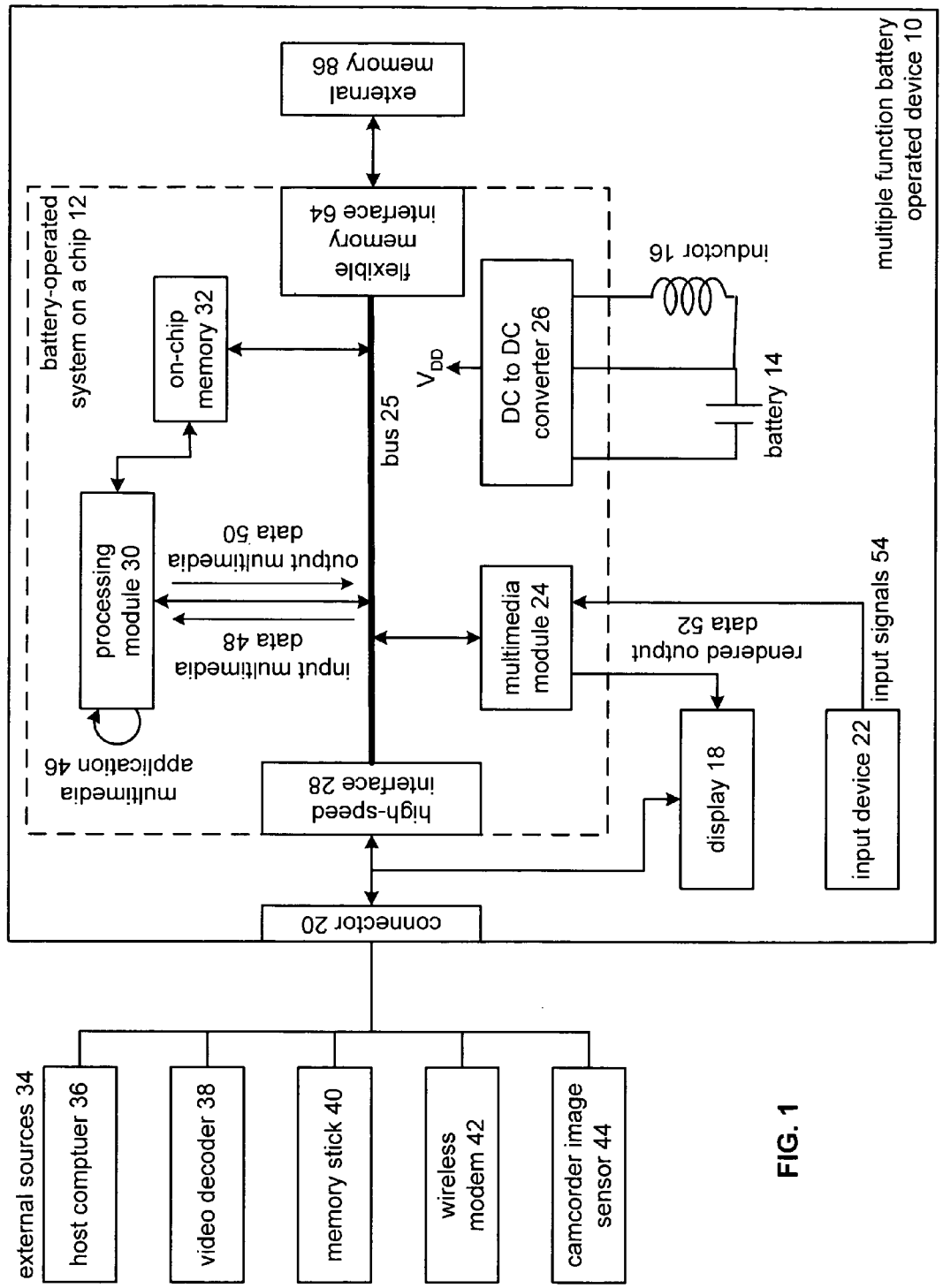
FIG. 1 is a schematic block diagram of a multiple function battery operated device that includes a battery-optimized system-on-a-chip in accordance with the present invention.

FIG. 1 is a schematic block diagram of a multiple function battery operated device 10 that includes a battery-optimized system-on-a-chip 12, a battery 14, an inductor 16, a display 18, a connector 20, and an input device 22. The connector 20 provides coupling between the battery-optimized system-on-a-chip 12 and an external source 34, which may be a host computer 36, a video decoder 38, a memory stick 40, a wireless modem 42, a camcorder image sensor 44. The battery-optimized system-on-a-chip 12 includes a multimedia module 24, a high-speed interface 28, a processing module 30, on-chip memory 32, an on-chip DC-to-DC converter 26, and a flexible memory interface 64 that provides coupling to at least one external memory 86. The flexible memory interface 64 will be described in greater detail with reference to FIGS. 3-5.

In general, the multiple function battery operated device 10 may be, but is not limited to, an MP3 player/recorder, a thumb drive memory extension, a digital camera, a digital camcorder, a DVD player/recorder, video conferencing device, a personal digital assistant (PDA), a radio, a television, and/or a CD player/recorder.

The DC-to-DC converter 26 is operably coupled to the battery 14 and inductor 16 to produce at least one supply voltage ($V_{DD}$). In general, the DC-to-DC converter may be a buck converter, a boost converter, a fly-back converter, a half bridge converter, and/or a full bridge converter. In one embodiment, the DC-to-DC converter is a boost converter that includes a sink transistor, at least one load transistor, and regulation circuitry. The regulation circuitry monitors the supply voltage ($V_{DD}$) with respect to a reference voltage and produces therefrom a regulation signal. The regulation signal, in one phase, enables the sink transistor to build up energy in the inductor and, in another phase, enables the load transistor to transfer the energy of the inductor to the supply voltage. The DC-to-DC converter 26 may be constructed in accordance with the teaching of U.S. Pat. No. 6,204,651, entitled METHOD AND APPARATUS FOR REGULATING A DC VOLTAGE and provides the supply voltage the processing module 30, the on-chip memory 32, the high-speed interface 28, the flexible memory interface 64, and/or the multimedia module 24. The DC-to-DC converter 26 may also provide the supply voltage off-chip to power the display 18 and/or the input device 22.

The high-speed interface 28 is operably coupled to bus 25 within the system-on-a-chip 12 and externally to the connector 20. As such, the high-speed interface 28, which may be a USB (universal serial bus) interface, a serial-to-deserial interface, or parallel interface, provides connectivity between one or more external sources 34 and the system-on-a-chip 12. For example, the host computer 36, which may be a personal computer, laptop, workstation, etc., provides digitized audio (e.g., an MP3 file, WMA—Windows Media Architecture—, MP3 PRO, Ogg Vorbis, AAC—Advanced Audio Coding, a CD file, etc.) and/or digitized video signals (e.g., an MPEG (motion picture expert group) file, a JPEG (joint photographic expert group) file, a DVD file, a video graphics file, a text file, etc.) to the high-speed interface 28. The high-speed interface 28 converts the format of the received data into a generic format of the system-on-a-chip, which is based on the type of processing module 30 and/or the type of on-chip memory 32. The high-speed interface then provides the generic formatted data to the processing module 30, the on-chip memory 32, and/or the multimedia module 24.

For instance, the digitalized audio and/or video data may be stored in the on-chip memory 32 and/or the external memory 86 for later playback, where the processing module 30 controls the storing of the data via a multimedia application 46. Note that processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The on-chip memory 32 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 30 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory 32 stores, and the processing module 32 executes, operational instructions corresponding to multimedia applications 46 that include, but are not limited to audio playback, audio record, video playback, video record, storing text, displaying text, storing video graphics, file system transfer, and/or displaying video graphics.

The data that is stored in the on-chip memory 32 and/or the external memory 86 may be subsequently retrieved under the control of the processing module 30 while executing a multimedia application 46 to render the data audible and/or visible. In this instance, the processing module 30 causes the data to be retrieved from the on-chip memory 32 and/or the external memory 86 and to be provided to the multimedia module 24. The multimedia module 24 processes the data to produce rendered output data 52, which may include analog audio signals, digital audio signals, analog video signals, digital video signals, text, and/or video graphics, and provides the rendered output data 52 to the display 18. The display 18, which may be a headphone jack, a speaker or speakers, an LCD video graphics display, an electro-luminance backlight video graphics display, etc., converts the rendered output data 52 into audible and/or visual information.

In other examples, the high-speed interface 28 may exchange audio data, video data, video graphics data, and/or text data with the video decoder 38, the memory stick 40, the wireless modem 42, and/or the camcorder image sensor 44. As such, the multiple function battery operated device 10 may function as a portable MP3 player/recorder, a personal DVD player/recorder, a personal CD player/recorder, etc.

The multimedia module 24 may also receive input signals 54 from the input device 22, which may be a microphone, a keypad, a video capture device (e.g., a digital camera or a digital camcorder), etc. Such input signals 54 may be video signals, audio signals, video graphics signals, and/or text signals. Upon receiving the input signals 54, the multimedia module 24, in conjunction with the processing module 30 executing a multimedia application, converts the input signals 54 into the generic digital format of the system-on-a-chip for storage in the on-chip memory or for providing to an external source via the high-speed interface 28.

As one of average skill in the art will appreciate, when the handheld device 10 is not coupled to the host device, (i.e., it is in a battery powered mode) the processing module 30 executes a multimedia application 46 to detect the disconnection and to place the handheld device in a battery operation mode. In the battery operation mode, the processing module 30 retrieves, and subsequently executes, a set of operational instructions from the on-chip memory 32 to support the battery operational mode. For example, the battery operational mode may correspond to MP3 file playback, digital dictaphone recording, MPEG file playback, JPEG file playback, text messaging display, cellular telephone functionality, and/or AM/FM radio reception.

As one of average skill in the art will further appreciate, due to the comprehensiveness of the system-on-a-chip 12, the battery-operated device 10 requires a minimal of additional components, thus reducing cost and complexity of the resulting device 10. Further, by including battery-optimizing techniques, the system-on-a-chip optimally consumes power to fully extend the life of the battery.

Figure 2:
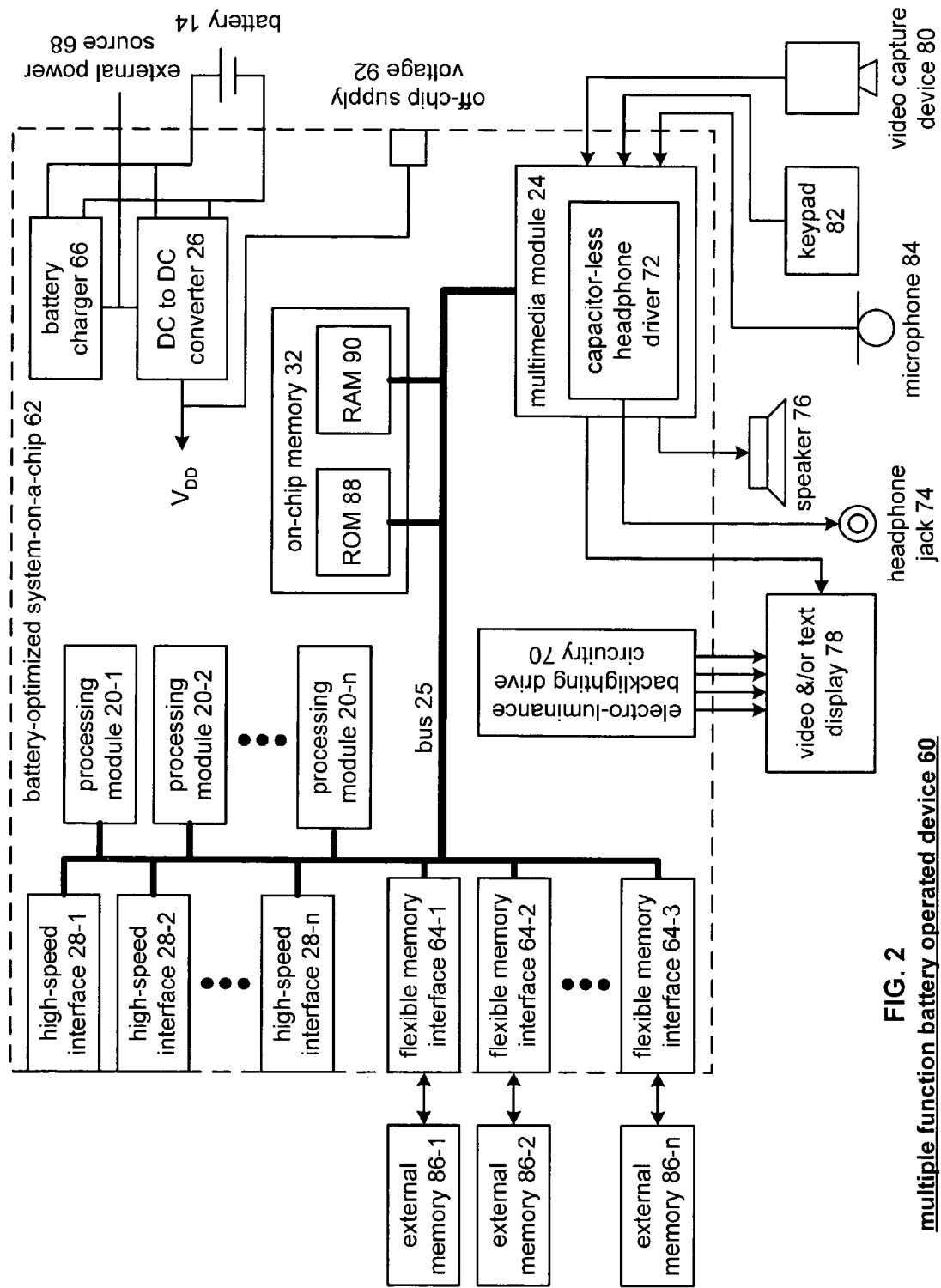
FIG. 2 is a schematic block diagram of another multiple function battery operated device that includes a battery-optimized system-on-a-chip in accordance with the present invention.

FIG. 2 is a schematic block diagram of another multiple function battery operated device 60 that includes a battery-optimized system-on-a-chip 62, a plurality of external memories 86, the battery 14, an external power source 68, a video and/or text display 78, a headphone jack 74, speaker(s) 76, a microphone 84, a keypad 82, and a video capture device 80. The battery-optimized system-on-a-chip 62 includes a plurality of high-speed interfaces 28, a plurality of flexible memory interfaces 64, a plurality of processing modules 30, the DC-to-DC converter 26, a battery charger 66, the on-chip memory 32, the multimedia module 24, and a electro-luminance backlighting drive circuitry 70. The multimedia module 24 includes a capacitor-less headphone driver 72. The on-chip memory 32 includes random access memory (RAM) 90 and read only memory (ROM) 88.

The plurality of high-speed interfaces 28-1 through 28-n allow the system-on-a-chip 62 to be simultaneously coupled to multiple external sources 34. The high-speed interfaces may utilize the same or different interface protocols. For example, all of the high-speed interfaces 28 may utilize a USB interface protocol, an Ethernet interface protocol, a fire-wire interface protocol, a serial/deserial interface protocol, etc. Alternatively, each high-speed interface 28-1 through 28-n may use a different interface protocol. For instance, high-speed interface 28-1 may support a USB interface, high-speed interface 28-2 may support Ethernet, and high-speed interface 28-n may support a fire-wire interface. One or more of the processing modules 30-1 through 30-n coordinates and arbitrates the high-speed interfaces 28 access to the bus 25.

The plurality of flexible memory interfaces 64-1 through 64-n allow the system-on-a-chip 62 to be coupled to the plurality of external memory devices 86-1 through 86-n. The external memory devices 86-1 through 86-n may be NAND flash memory devices, NOR flash memory devices, and/or any other type of random access memory devices or read only memory devices. While executing one or more multimedia applications, one or more of the processing modules 30 coordinates the reading and/or writing of multimedia data to and from the external memory devices 86. For instance, one of the external memory devices 86 may store MP3 files for subsequent playback, another external memory device 86, may store video files (e.g., MPEG, JPEG, etc.) for subsequent playback, and another external memory device may store text and/or video graphics relating to operation of the device 60 and/or related to inputted data via the keypad 82, the video capture device 80, and/or one of the external sources 34.

Each of the external memory devices 86 may or may not be compliant with a memory interface standard. As such, the flexible memory interfaces 64 include a flexible topology to accommodate the various types of external memory devices 86 that may be coupled to the system-on-a-chip 62 as will be described in greater detail with reference to FIGS. 3-5.

The multimedia module 24 is operably coupled to receive input signals 54 from a microphone 84, a keypad 82, and/or a video capture device 80. The video capture device 80 may be a digital camera and/or a digital camcorder that supplies MPEG files, JPEG files, and/or other standardized format for still and/or motion digital images. The multimedia module 24 receives the digital video images from the video capture device 80 and either converts them into the generic format of the system-on-a-chip to produce generic video that are stored either in the on-chip memory 32 and/or in the external memory 86 or provides the digital video images to the bus 25 for storages in the on-chip memory 32 and/or in the external memory 86. One or more of the processing modules 30 coordinates the storing of the digital video images and whether the data will be converted to the generic format or not. The generic format may involve portioning packets of the video image into data words of a size corresponding to the bus width of the processing modules 30, storage word size of the on-chip or off-chip memory, and/or of the bus width of the bus 25.

The multimedia module 24 is also coupled to receive input signals 54 from the keypad 82. The keypad 82 may be a touch screen pad, a keyboard, voice recognition module, and/or any device that produces text messages. The multimedia module 24 receives the text messages from the keypad 82 and either processes them for display on the video and/or text display 78 or for storage in the RAM 90 and/or in the external memory 86. The processing of the text message may involve routing it to the video and/or text display 78, converting it to the generic format for storing in the RAM 90 or the external memory 86, or rendering it for display (i.e., converting text information into pixel information).

The multimedia module 24 is further coupled to receive input signals 54 from the microphone 84. The multimedia module 24 converts the analog audio input signals from the microphone 84 into digital audio input signals using an encoding scheme, such as pulse code modulation (PCM). The multimedia module 24 provides the digital audio signals to the RAM 90 and/or the external memory 86 for storage under the control of the processing module 30, which is executing an audio recording multimedia application 46. Accordingly, in this mode, the multiple function battery operated device 60 may function as a dictaphone.

The multimedia module 24 is operably coupled to provide analog audio signals to the speaker(s) 76 and/or to the headphone jack 74. The multimedia module 24 may generate the analog audio signals by performing a PCM decoding of digital audio signals stored in the on-chip memory 32 and/or stored in the external memory 86. The multimedia module 24 includes a driver, or multiple drivers, to supply the analog audio signals to the speaker(s) 76. The multimedia module 24 also includes the capacitor-less headphone driver 72 to supply the analog audio signals to the headphone jack. The capacitor-less headphone driver 72 reduces the number of external components by eliminating the need for coupling capacitors from the on-chip drivers to the headphone jack, wherein the coupling capacitors enabled level shifting of the analog audio signals from the driver level of 0.9 volts (e.g., AC ground for the left channel and right channel drivers) to 0 volts for the headphones. By reducing the number of required external components, the cost of producing a device 10 is reduced without sacrificing features and/or functionality.

The multimedia module 24 is further coupled to the video and/or text display 78, which may be an electro-luminance backlight display, an LCD display, or any other type of display that displays text, video graphics, and/or video images (still or motion). The multimedia module 24 receives digital video data from the on-chip memory and/or the external memory 86 under the control of the processing module 30, which is executing a text and/or video playback multimedia application. Upon receiving the digital video data, the multimedia module 24 converts it into pixel information (e.g., RGB, YUV, YcrCb, etc.), which is provided to the display 78.

If the display 78 is an electro-luminance backlight display, the system-on-a-chip includes the electro-luminance backlighting drive circuitry 70. In general, the electro-luminance backlighting drive circuitry 70 provides the control signals for the power transistors of the electro-luminance backlight display, thus eliminating the need for an extra integrated circuit to generate the control signals. By eliminating the need for an extra integrated circuit, the cost of producing a device 10 is reduced without sacrificing features and/or functionality.

The battery charger 66 is operably coupled to charge the battery 14 when the external source 68 is coupled to the device 10. The external source 68 may be a 5 volt supply that is received via a USB connection to a host computer or other external source having a USB connection. The details of the battery charger 66 are described in co-pending patent application entitled TBD, having the same filing date as the present patent application, and having an attorney docket number of SIG000089 and co-pending patent application entitled TBD, having the same filing date as the present patent application, and having an attorney docket number of SIG000092.

Each of the processing modules 30-1 through 30-*n* may be a single processing device or a plurality of processing devices. Such a processing device may be a microprocessor, micro-controller, digital signal processor, microcomputer, central processing unit, field programmable gate array, programmable logic device, state machine, logic circuitry, digital circuitry, and/or any device that manipulates signals (analog and/or digital) based on operational instructions. Further, each of the processing modules may be performing separate multimedia applications and/or co-process a single multimedia application. Such multimedia applications 46 include, but are not limited to, audio playback, audio record, video playback, video record, storing text, displaying text, storing video graphics, file system transfer, and/or displaying video graphics.

The on-chip memory 32 is shown to include ROM 88 and RAM 90. The ROM 88 may store a boot algorithm to initiate the battery-optimized system-on-a-chip 62, video graphics data, and/or any other system level data that should not be overwritten. The RAM 90 may be used as a first and/or second level cache memory for the processing modules 30 and may range from a few hundred kilobits to several hundreds megabits of storage capacity.

Figure 3:
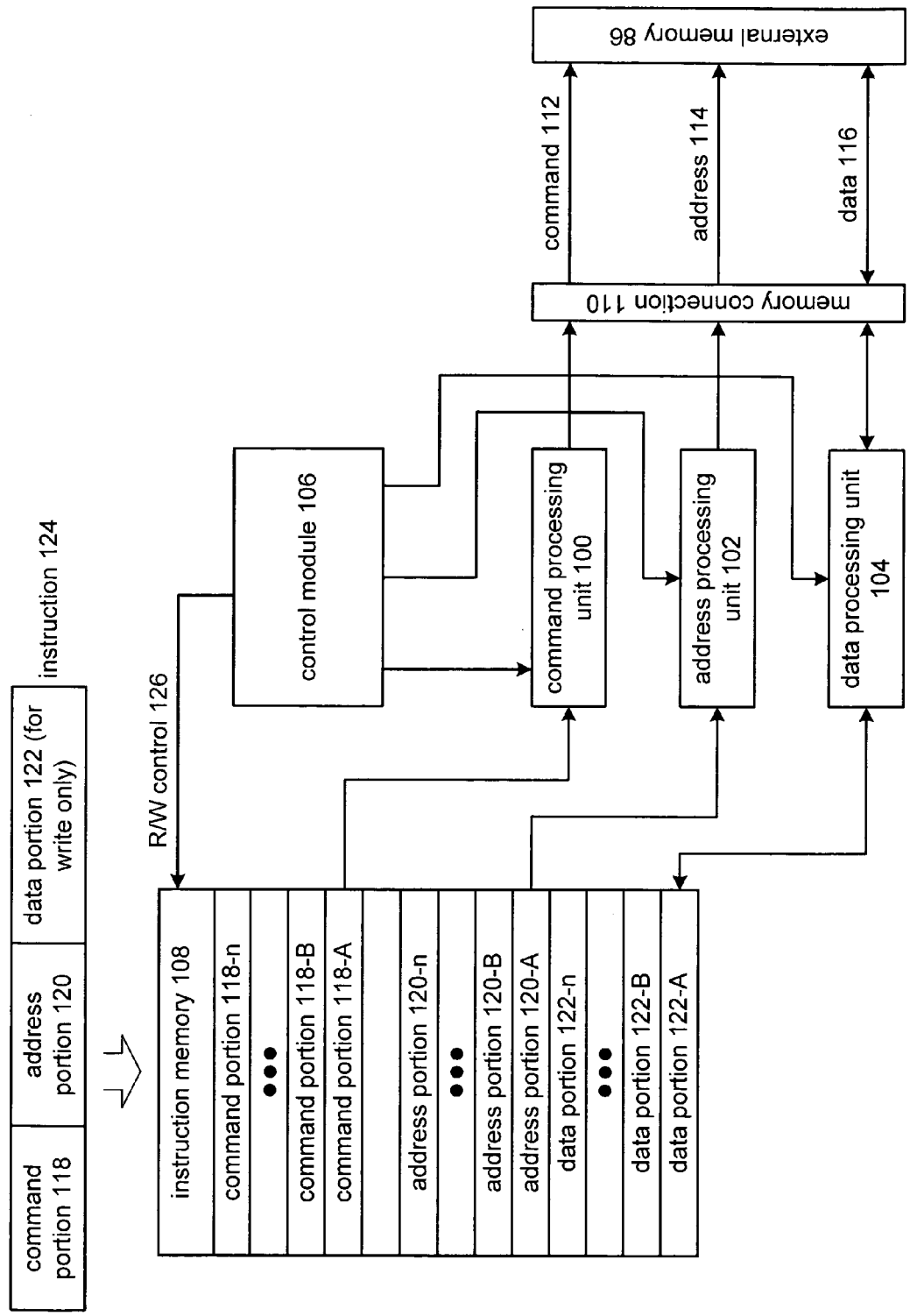
FIG. 3 is a schematic block diagram of a flexible memory interface system in accordance with the present invention.

FIG. 3 is a schematic block diagram of a flexible memory interface 64 that includes a control module 106, an instruction memory 108, a command processing unit 100, an address processing unit 102, a data processing unit 104, and a memory connection 110. The control module 106 may be a separate module or implemented within the processing module 30. If the control module 106 is a separate module, it may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Each of the command processing unit 100, the address processing unit 102, and the data processing unit 104 are independently functioning processing devices, which may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

In operation, instructions 124 are received to access the external memory 86. Each instruction includes a command portion 118 and an address portion 120. The command portion 118 indicates the type of memory access being requested via the instruction, which may be read data, write data, and transfer data. The address portion 120 includes one or more addresses to indicate where the data is to be read from, where the data is to be written to, or where data at one address is to be transferred. If the instruction is for writing data to the external memory, the instruction also includes a data portion 122, which contains the data, or a least a portion of the data, to be written into the external memory.

As an instruction is received, the control module 106 separates the portions of the instruction and stores them individually within the instruction memory 108. In the illustration of FIG. 3, the command portions are stored in one section of the instruction memory 108, the address portions are stored in another section of the instruction memory 108, and the data is stored in yet another section of the instruction memory 108. As one of average skill in the art will appreciate, the portions of the instructions may be stored within the instruction memory 108 in any manner to facilitate the storing and retrieving of the commands.

As is further illustrated in FIG. 3, "n" number of instructions is stored in the instruction memory 108. If, for example, instructions A and "n" are write instructions and instruction B is a read instruction, the data portions of instructions A and "n" 122-A and 122-*n* store data that is to be written into the external memory, while the data portion of instruction B 122-B is reserved memory space within the instruction memory 108 to store the data once it is read from the external memory 86. While not illustrated, if the command of an instruction is to transfer data from one location within the external memory 86 to another location within the external memory 86, then there will not be an associated data portion for the instruction.

With the portions of at least one instruction stored in the instruction memory 108, the control module 106, via a Read/Write signal 126 and control signals to the command processing unit 100, the address processing unit 102, and the data processing unit 104, enables the command portion 118 to be read into the command processing unit 100, the address portion 120 to be read into the address processing unit 102, and, if applicable, the data portion 122 to be read into the data processing unit 104. The command processing unit 100 processes the command portion 118 to produce a command 112. Independently, the address processing unit 102 processes the address portion 120 to produce an address 114, which may be include one or more addresses. The data processing unit 104, independently of the address processing unit 102 and the command processing unit 100, processes the data portion 122, for write commands, to produce data 116.

After the command processing unit 100, the address processing unit 102, and the data processing unit 104 have performed their functions on the respective portions of an instruction, the control module 106 coordinates providing the command 112, the address 114, and, for a write instruction, the data 116 to the external memory in accordance with the memory access protocol of the external memory 86. As one of average skill in the art will appreciate, the memory access protocol from one external memory 86 to another may vary in size of the portions, timing of receiving the command, the address, and/or the data. Accordingly, the control module 106 provides the command processing unit 100, the address processing unit 102, and the data processing unit 104 with the size of the portions of an instruction. As such, as the memory access protocol changes, the flexible memory interface 64 can be readily adjusted to accommodate the differences in memory access protocols.

For a read instruction, the command processing unit 100 generates a read command 112 from the command portion 118 and the address processing unit 102 generates an address 114 from the address portion 120. The control module 106 coordinates the providing of the command 112 and the address 114 to the external memory 86. The control module 106 also coordinates the receiving of data 116 into the data processing unit 104. Upon receiving the data 116, the data processing unit 104 provides it to the instruction memory 108 for storage in the allocated location. The control module 106 then causes the data to be read from the instruction memory 108 and provided to the requesting module within the system-on-a-chip 12 or 62.

To facilitate the processing of multiple instructions, each of the processing units 100, 102, and 104 may include buffers to store their respective portions. Accordingly, each processing unit 100, 102, and 104 may process their corresponding portions for multiple instructions and buffer the resulting command 112, address 114, and data 116, respectively. The control module 106 coordinates the retrieval of the appropriate command 112, address 114, and data 116 for a given instruction when the external memory can be accessed.

FIGS. 4A through 4D illustrate various memory access protocols and differing instructions that can be readily processed by the flexible memory interface 64. FIG. 4A illustrates a first memory access protocol that requires a wait cycle 132 and 134 between the providing of the read command 130, the address 134, and the retrieval of the data 138. The first memory access protocol also dictates the size (i.e., the number of bytes and the number of cycles to transmit the corresponding information; e.g., 8 byte address that is transmitted 2-bytes per clock cycle) of the read command 130, the address 134, and the data 138. Accordingly, the command processing unit 100 generates the read command 130 to be of the appropriate size and the address processing module 102 generates the address 134 to also be of the appropriate size. The control module 106 controls the sequencing of the command, the address, and the data to be compliant with the particular memory access protocol. In this example, the control module 106 causes the command processing module 100 to provide the read command 130 to the external memory 86. After a wait cycle 132, the control module 106 enables the address processing unit 102 to provide the address 134 to the external memory 86. After another wait cycle 136, the control module 106 enables the data processing unit 104 to receive the data 138.

FIG. 4B illustrates the first memory access protocol for a write command. In this example, the control module 106 enables the command processing unit 100 to provide the write command 140 to the external memory 86. After a wait cycle 132, the control module 106 enables the address processing unit 102 to provide the address 142 to the external memory 86. After another wait cycle, the control module 106 enables the data processing unit 104 to provide the data 144 to the external memory 86.

FIG. 4C illustrates a second memory access protocol for a read command. In this example, the external memory 86 does not require a wait cycle between the command and the address. Further, the size of the command, the address, and the data may be bigger or smaller than in the first memory access protocol. Thus, based on these parameters of the second memory access protocol, the control module 106 enables the command processing unit 100 to generate the read command 150 and to provide it to the external memory 86. After the read command is provided to the external memory, the control module 86 enables the address processing unit 102 to provide the address 152 to the memory. After a wait cycle 154, the control module 106 enables the data processing unit 104 to receive data 156.

FIG. 4D illustrates the second memory access protocol for a write command. In this example, the control module 106 enables the command processing unit 100 to provide the write command 158 to the external memory 86. After the write command is provided to the external memory, the control module 106 enables the address processing unit 102 to provide the address 160 to the external memory 86. After a wait cycle 162, the control module 106 enables the data processing unit 104 to provide the data 164 to the external memory 86.

As one of average skill in the art will appreciate, the flexible memory interface 64 may be configured to accommodate any type of memory access protocol by independently processing the command portion, the address portion, and the data portion of an instruction to access memory. As one of average skill in the art will further appreciate, the control module 106 may determine the memory access protocol of the external memory manually (i.e., the access protocol is selected at assembly of the device) or automatically via a negotiation with the external memory 86.

Figure 5:
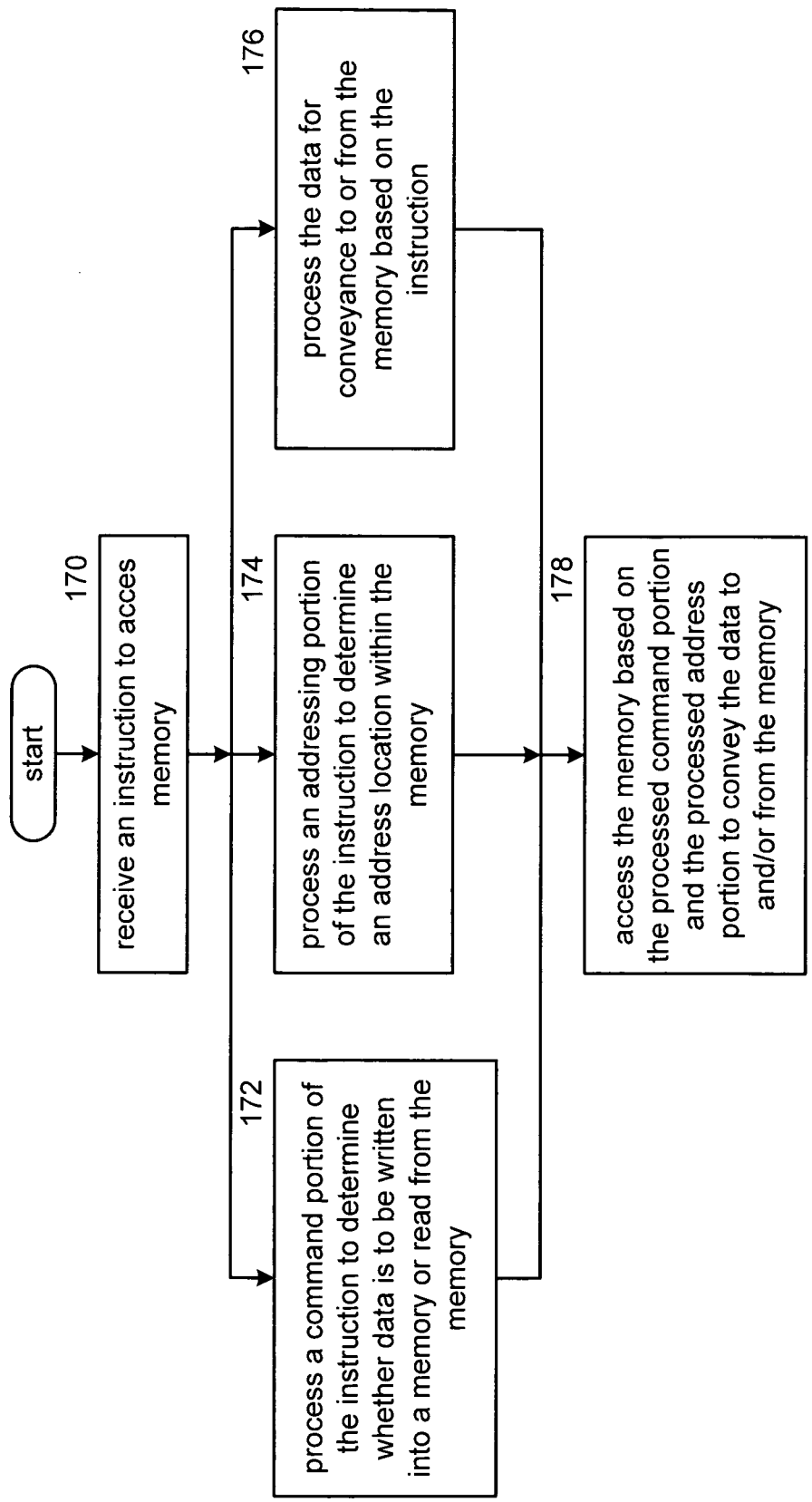
FIG. 5 is a logic diagram of a method for processing an instruction to access various memories in accordance with the present invention.

FIG. 5 is a logic diagram of a method for processing an instruction to access various memories, which may be performed by the processing module 30 and/or the flexible memory interface 64. The process begins at step 170, where an instruction to access memory is received. The instruction includes a command portion and an address portion for read instructions and data transfer instructions and includes a command portion, an address portion, and a data portion for write instructions. The process then proceeds independently to steps 172, 174, and 176.

At step 172, a command portion of the instruction is processed to determine whether data is to be written into a memory or read from the memory, where a data transfer includes both reading and writing of data. As a result, a command is produced. At step 174, an addressing portion of the instruction is processed independently of the processing the command portion to determine an address location within the memory, resulting in an address. At step 176, the data for conveyance to or from the memory is processed independently of the processing the command portion and the address portion and based on the instruction to access the memory. The processing of the command, the address, and the data, for write instructions, may be done by controlling storing and retrieving of the command portion, the addressing portion, and the data from an instruction memory.

The process then proceeds to step 178 where the memory is accessed based on the command, the address to convey data to and/or from the external memory. The providing of the command, the address, and the conveyance of the data may be done in accordance with a retrieval sequence based on an access protocol of the external memory. The access protocol further dictates the size of the command portion, the address portion, and the data. The access protocol may be determined manually or automatically by negotiating with the memory, where the negotiation involves reading an ID field of the memory determine an identity of the type of memory and, based on the type of memory, determining the access protocol.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a flexible memory interface that allows a single memory interface system to accommodate a variety of memories having differing memory access protocols. This is at least partially accomplished by independently processing the command portion, the address portion, and the data portion of an instruction to access memory. As one of average skill in the art will appreciate, other embodiments may be derived from the teachings of the present invention without deviating from the scope of the claims.

What is claimed is:

1. A method for processing an instruction to access various memories, the method comprises:
   processing a command portion of an instruction to access memory to determine whether data is to be written into a memory or read from the memory;
   processing, independently of the processing the command portion, an addressing portion of the instruction to access the memory to determine an address location within the memory; and
   in response to the instruction to access the memory including data in a data portion, processing, independently of the processing the command portion and the address portion, the data in the data portion for conveyance to the memory based on the instruction to access the memory.

2. The method of claim 1, wherein the processing the data in the data portion for conveyance to the memory further comprises:
   storing the data in the data portion within a buffer for subsequent writing to the memory when the instruction to access the memory is a write instruction.

3. The method of claim 1 further comprises:
   writing the data in the data portion to the memory at the address location when the command portion is a write request; and reading the data in the data portion from the address location of the memory when the command portion is a read request.

4. The method of claim 1 further comprises:
   controlling storing and retrieving of the command portion, the addressing portion, and the data in the data portion from an instruction memory for the independent processing of the command portion, the address portion, and the data in the data portion for conveyance to the memory.

5. The method of claim 4 further comprises:
   utilizing a retrieval sequence of the command portion, the address portion, and the data in the data portion from the instruction memory in accordance with an access protocol of the memory.

6. The method of claim 5 further comprises:
   determining size of the command portion, the address portion, and the data in the data portion of the instruction to access the memory based on the access protocol of the memory.

7. The method of claim 5 further comprises:
   negotiating with the memory to determine the access protocol of the memory.

8. The method of claim 7, wherein the determining the access protocol further comprises:
   reading an ID field of the memory determine an identity of the type of memory; and
   based on the type of memory, determining the access protocol.

9. An apparatus for processing an instruction to access various memories, the apparatus comprises:
   processing module; and
   memory operably coupled to the processing module, wherein the memory stores operational instructions that cause the processing module to:

process a command portion of an instruction to access memory to determine whether data is to be written into a memory or read from the memory;

process, independently of the processing the command portion, an addressing portion of the instruction to access the memory to determine an address location within the memory; and in response to the instruction to access the memory including data in a data portion, process, independently of the processing the command portion and the address portion, the data in the data portion for conveyance to the memory based on the instruction to access the memory.

10. The apparatus of claim 9, wherein the memory further stores operational instructions that cause the processing module to process the data in the data portion for conveyance to the memory by:

storing the data in the data portion within a buffer for subsequent writing to the memory when the instruction to access the memory is a write instruction.

11. The apparatus of claim 9, wherein the memory further stores operational instructions that cause the processing module to:

write the data in the data portion to the memory at the address location when the command portion is a write request; and read the data from the address location of the memory when the command portion is a read request.

12. The apparatus of claim 9, wherein the memory further stores operational instructions that cause the processing module to:

determine size of the command portion, the address portion, and the data in the data portion of the instruction to access the memory based on the access protocol of the memory.

13. The apparatus of claim 9, wherein the memory further stores operational instructions that cause the processing module to:

control storing and retrieving of the command portion, the addressing portion, and the data in the data portion from an instruction memory for the independent processing of the command portion, the address portion, and the data in the data portion for conveyance to the memory.

14. The apparatus of claim 13, wherein the memory further stores operational instructions that cause the processing module to:

utilize a retrieval sequence of the command portion, the address portion, and the data in the data portion from the instruction memory in accordance with an access protocol of the memory.

15. A flexible memory interface system comprises:

command processing unit operable to process a command portion of an instruction to access memory;

address processing unit operable to process an addressing portion of the instruction to access the memory; and data processing unit operable to process data in the data portion for conveyance to the memory in response to the instruction to access the memory including the data in a data portion;

wherein the command processing unit, the address processing unit and the data processing unit are configured in parallel to independently process the command portion, the addressing portion, and the data in the data portion for conveyance to the memory respectively.

16. The flexible memory interface system of claim 15 further comprises:

control module; and instruction memory, wherein the control module is further operable to store and retrieve the command portion, the addressing portion, and the data in the data portion from the instruction memory with the command processing unit, the address processing unit, and the data processing unit, respectively.

17. The flexible memory interface system of claim 16 further comprises:

the instruction memory operable to store a plurality of instructions to access the memory, wherein each instruction of the plurality of instructions to access the memory includes at least a command portion and an address portion, wherein the control module is further operable to, for each of the plurality of instructions to access the memory, store and retrieve the command portion, the addressing portion, and associated data in the data portion of the instruction memory in an asynchronous manner.

18. The flexible memory interface system of claim 17 wherein further the control module is operable to store the command portions of the plurality of instructions to access the memory, to store the address portions of the plurality of instructions to access the memory, and to store the associated data in the data portion of the plurality of instructions to access the memory in an interleaved manner within the instruction memory.

19. The flexible memory interface system of claim 17 wherein further the control module is operable to utilize a retrieval sequence of the command portion, the address portion, and the associated data in the data portion of the instruction memory in accordance with an access protocol of the memory.

20. The flexible memory interface system of claim 16 wherein further the control module is operable to determine a size of the command portion, the address portion, and the data in the data portion of the instruction to access the memory based on access protocol of the memory.

21. The flexible memory interface system of claim 16, wherein the control module is further operable to:

determine whether the memory is a first type of memory or a second type of memory;

process the instruction using a first access protocol in response to the flexible memory interface being coupled to the first type of memory; and process the instruction using a second access protocol in response to the flexible memory interface being coupled to the second type of memory.

22. The flexible memory interface system of claim 16 wherein further the control module is operable to negotiate with the memory to determine access protocol of the memory.

23. The flexible memory interface system of claim 22, wherein further, in determining the access protocol the control module is operable to read an ID field of the memory to determine an identity of the type of memory and based on the type of memory, to determine the access protocol.

24. The flexible memory interface system of claim 15, wherein further:

the command processing unit includes a command buffer operable to store a plurality of command portions;

the address processing unit includes an address buffer operable to store a plurality of address portions; and the data processing units includes a data buffer operable to store the data in the data portion for conveyance to the memory.

25. The flexible memory interface system of claim 15, wherein the flexible memory interface is operable to:
   process the instruction using a first access protocol in response to the flexible memory interface being coupled to a first type of memory; and
   process the instruction using a second access protocol in response to the flexible memory interface being coupled to a second type of memory.

\* \* \* \* \*